Figure 1:
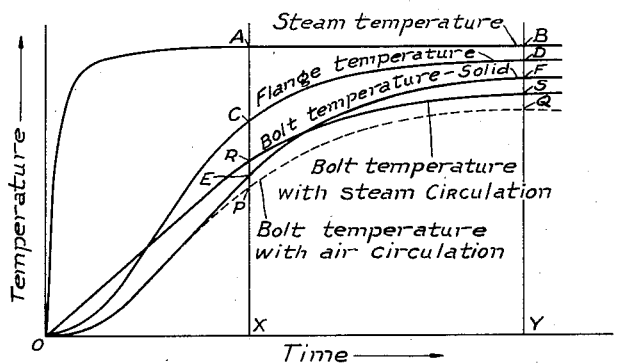

Aug. 7, 1934.

H. L. GUY 1,969,556

FLANGED JOINT

Filed Dec. 12, 1931

Inventor:
Henry L. Guy,
by Charles E. Tullar
His Attorney.

Patented Aug. 7, 1934

1,969,556

UNITED STATES PATENT OFFICE 1,969,556

FLANGED JOINT

Henry L. Guy, Hale, England, assignor to General Electric Company, a corporation of New York Application December 12, 1931, Serial No. 580,695
In Great Britain December 19, 1930

3 Claims. (Cl. 253—39)

This invention relates to flanged joints in which external flanges forming a joint connecting two portions of a steam cylinder or steam pipe or other receptacle for containing fluid or substance at a comparatively high temperature are held together by means of bolts.

In flanged joints of the character above indicated, when fluid, steam for example, at a high temperature is first admitted into the receptacle, the temperature of the inside of the receptacle rises more or less rapidly to a maximum temperature. The rise of temperature in the flanges takes place more slowly and the rise of temperature in the bolts holding the flanges together takes place more slowly still, but at the end of a certain time these parts will attain maximum constant temperatures which will, of course, be different for each part. The difference of temperature between the bolts and the flanges and therefore the stress in the bolts resulting from such difference in temperature will be a maximum at some time while the temperature is still rising and will gradually be reduced as the temperature in these parts rises to its maximum.

It would be advantageous during this phase of the operation if the temperature difference between the bolts and the inside of the flanges, pipes or vessels were reduced by reducing this temperature difference, or by raising the temperature of the bolt itself.

The resistance of a bolt to "creep" is, however, greater the lower the temperature, and consequently it would be advantageous if the maximum temperature to which the bolt rises were reduced at the maximum temperature reached by the parts, provided the difference of temperature between the bolt and the flanges at this temperature is such that the stress in the bolt is not increased beyond the maximum value permissible at that temperature.

The object of my invention is an improved construction for flanged joints and like members fastened together whereby the temperature differences of the parts forming the joint are reduced or equalized and the creeping of the bolts substantially prevented.

According to the present invention, in a joint of the kind such as above described, a hole is formed axially through each bolt and means are provided for causing a circulation of gas or vapor through the bolt so as to control the temperature thereof as desired. For example, at starting up, the stress in the bolts and flanges can be reduced if the difference of temperature between the bolts and the inside of the flanges is reduced which may be accomplished by heating the bolts by circulating hot air or vapor such as steam through them during the initial period when the bolts and flanges are rising in temperature. The increase in temperature in the bolts will therefore take place at a greater rate than would otherwise be the case with the result that the maximum difference of temperature between the bolts and the flanges will be reduced.

If on the other hand it is desired to lower the maximum temperature which the bolts attain the bolts may be cooled by circulating through them air or vapor at a suitable temperature. The cooling, however, should be regulated so that too great a reduction in temperature shall not take place which would unduly increase the difference of temperature between the bolts and the flanges.

In a simple embodiment the bolts may be cooled by the natural draught obtained by fitting a tube or tubes of a suitable length into the ends of one or both of the nuts or bolts. In this way the draught created varies with the temperature of the bolt and a change in temperature of the right character is obtained. A higher degree of cooling may be obtained by circulating air or other gas or vapor under pressure which is very often available. A convenient source of pressure is the ventilating system used in electric generators when these are present.

Steam may be advantageously employed as the circulating medium to attain both the results above indicated. For example, steam at a suitable temperature may be circulated through the bolts during the starting period for the purpose of heating the bolts and thus increasing the rate of temperature rise therein. At a later period the temperature of the bolts will have risen by conduction from the flanges above that of the circulating steam which will consequently then act to cool the bolts and reduce the maximum temperature to which they attain.

Figure 2:
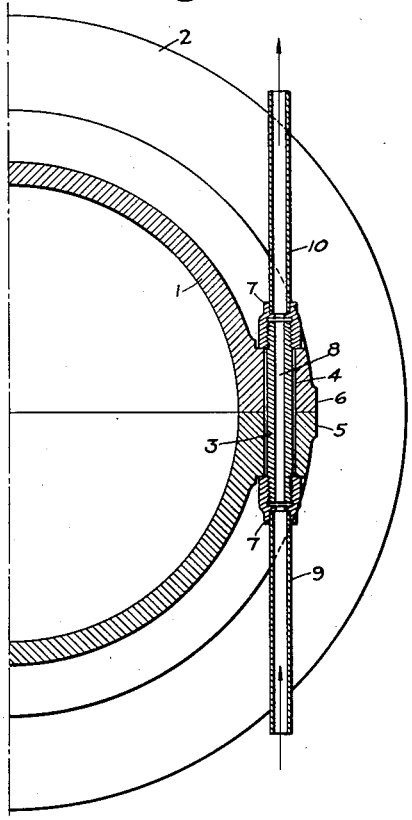
Figure 3:
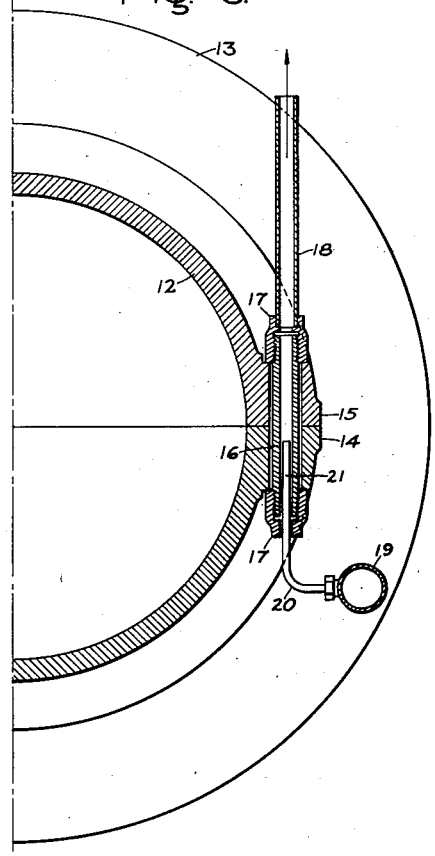

To enable the invention to be clearly understood it will now be described with reference to the accompanying drawing in which Fig. 1 is a temperature diagram, whilst Figs. 2 and 3 are sectional views through the flanged joints of a high pressure turbine cylinder showing two different means in accordance with the invention for controlling the temperature of the bolts.

Referring first to Fig. 1 of the drawing, the curves represent the temperature rises on different parts with time, commencing from the time when the steam is first admitted to the vessel such as the high pressure cylinder of a turbine until the parts reach a steady temperature. Curve OAB represents the steam temperature or more exactly the temperature of the inner surface of the vessel through which the steam flows. Curve OCD represents the temperature of the flange of the joint. Curve OEF represents the temperature of the bolt in the joint when the latter is of the ordinary solid kind heretofore used, whilst curve OPQ represents the temperature of the bolt when cooled, in accordance with the present invention, by circulating a medium through it at a temperature equal to or less than the initial temperature of the bolt, whilst curve ORS represents the temperature of the bolt when a medium of moderate temperature is circulated through it. The steady temperature is supposed to be reached after a time Y. At or soon after a time X it will be seen that there is a maximum difference of temperature represented approximately by CE between the flange and the solid bolt when also the mechanical stress will be about a maximum. At such time the temperature of the bolt is represented approximately by EX which being less than the steady temperature FY the resistance of the bolt to "creep" is considerably greater than under the final normal running conditions. At the time Y when the temperature is steady there is still a difference in temperature between the solid bolt and flange, as represented by DF and the tendency of the bolt to "creep" depends on the temperature FY. It will therefore be advantageous to increase the temperature difference DF such as to that represented by DQ or DS whilst it will not be desirable to increase appreciably the difference in temperature represented approximately by CE or CP at or soon after time X during starting up, since at such time the temperature difference is already a maximum, but it may be desirable to reduce the difference such as to about CR. In other words, it is desirable to reduce the differences of the temperature-differences between the times X and Y. This is achieved, according to the present invention, by the provision of means which cause a decrease of the final temperature of the bolt to the effect that the difference DF increases and becomes substantially equal to the difference CE. The desired effect may also be achieved by decreasing the intermediate temperature difference CE and increasing the final temperature difference DF. By intermediate temperature differences, I means the differences at any time between the temperatures of the parts forming the flange joint from the beginning of the operation until the parts reach constant temperatures resulting in constant or final temperature differences between the different parts.

Referring to Fig. 2, where I have shown by way of example an arrangement embodying my invention, 1 represents a high pressure cylinder or conduit of a steam turbine surrounded by lagging 2 in the usual manner and 3 designates a bolt extending through openings 4 in the flanges 5 and 6 for fastening the flanges together by means of nuts 7 provided on the screw-threaded ends of the bolt. The bolt 3 according to my invention is provided with an axial bore 8 extending from end to end of the bolt. Fastened to the nuts are tubular members or tubes 9 and 10 respectively extending through the lagging and registering with the bore of the bolt and defining an extension of the hollow space of the bolt. The arrangement is such that the desired temperature is automatically obtained by a natural air flow through the tubes and the bolt. It will be readily understood that as soon as the bolt is heated during the operation, the air in the hollow space of the bolt will be heated accordingly and this will cause a natural draught whereby heated air rises and escapes through tube 10 and fresh cooling air is supplied through tube 9 as indicated by arrows. This causes a decrease of the final temperature of the bolt whereby the final temperature difference DF in Fig. 1 is increased to DQ which is of the order of the intermediate temperature difference CP at the time X.

In Fig. 3 I have shown an arrangement for supplying a cooling or heating medium through the bolt. 12 represents a portion of a high pressure cylinder or conduit of a steam turbine surrounded by lagging 13, similar to the arrangement shown in Fig. 1. Flanges 14 and 15 are fastened together by means of a hollow bolt 16 provided with nuts 17. 18 designates a tube fastened to the upper nut 17 and defining an extension of the hollow space of the bolt. Cooling or heating fluid is supplied to the bolt from a manifold 19 which is connected to the bolt by means of a conduit 20. The temperature of the fluid supplied from manifold 19 through the hollow bolt is preferably intermediate the temperature of the fluid passed through conduit 12 and the temperature of the atmosphere, that is, if, for instance, an elastic fluid of 1200° F. is conveyed through conduit 12 it will be preferable to supply a heating and cooling medium to the bolt of a temperature of the order of about 500° F. This fluid forms a heating medium in the beginning of the operation, that is, from the time when elastic fluid is conveyed through conduit 12, at which time this conduit has room temperature. As soon as the temperature of the flange and the bolt rises beyond the temperature of the fluid supplied through the bolt, this fluid becomes a cooling medium. In this manner we obtain the course of temperature of the bolt which is indicated by the curve OES in Fig. 1.

In some cases it may be desirable to introduce the temperature-controlling medium to the bolt approximately in the center of the latter in order to reduce the difference between the average and maximum temperature of the bolt. For this purpose conduit 20 of Fig. 3 has been extended as indicated at 21. The heating and cooling medium supplied through conduit 20 and 21 escapes through conduit 18 into the atmosphere or it may also be returned by suitable means, not shown, to its source of supply.

Having described my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is,—

1. The combination with a heated conduit through which a hot substance is conveyed and which is provided with a flanged joint having a hollow bolt for fastening the flanges together, of means including another conduit connected to the hollow bolt, a fluid having a temperature intermediate that of the substance and the surrounding atmosphere contained in the other conduit and the hollow bolt to decrease the difference between the intermediate and final temperature differences of the bolt and the adjacent parts.

2. The combination with a flanged joint subject to heat and having a hollow bolt for fastening the flanges together, of a tubular member having one end fastened to one end of the bolt and another end communicating with the atmosphere to define an extension of the hollow space of the bolt whereby heating of the bolt causes a natural draught of cooling air through the bolt and the tubular member.

3. The combination as claimed in claim 1 in which said other conduit extends to the center of the bolt whereby a more uniform heating and cooling of the bolt is obtained.

HENRY L. GUY.